Oct. 13, 1953   A. STRICKLER ET AL   2,655,073
OPTICAL THICKNESS GAUGE
Filed Sept. 23, 1950
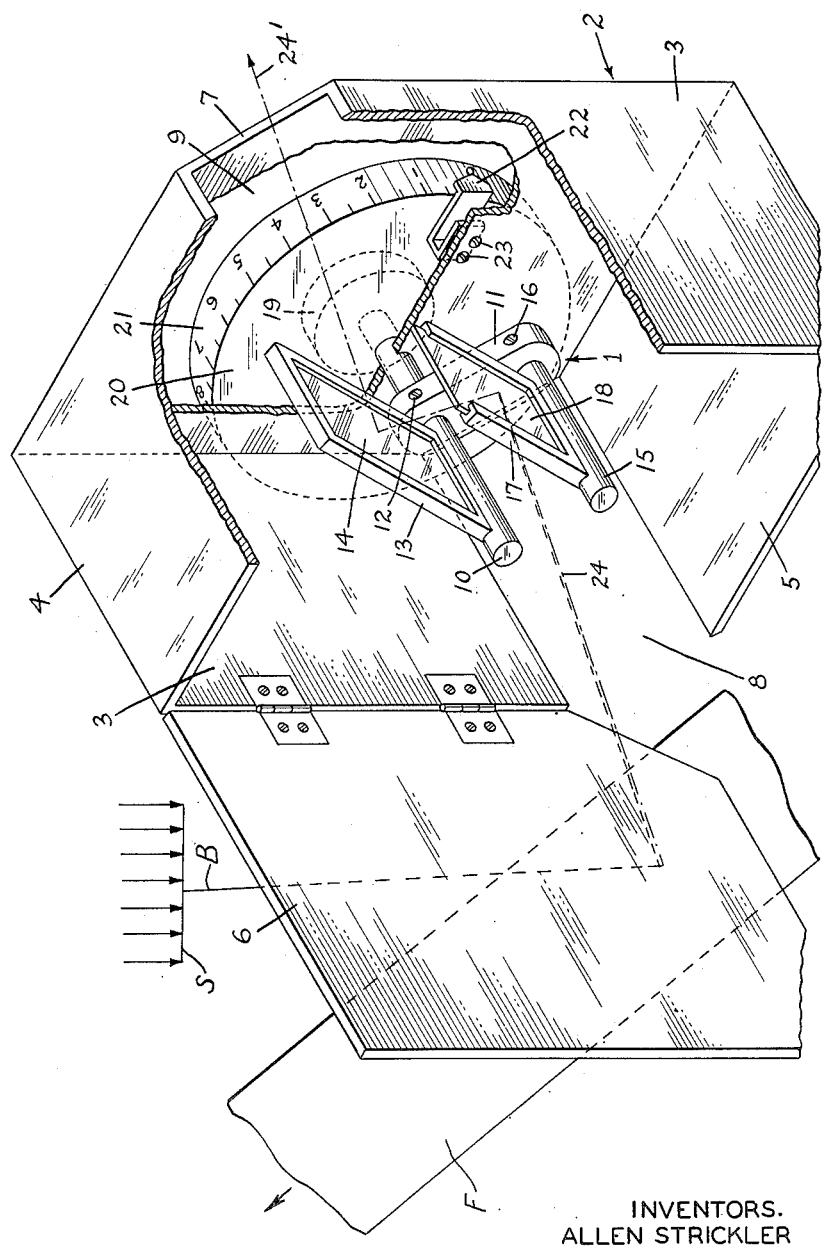
INVENTORS.
ALLEN STRICKLER
JOHN H. TEEPLE
BY
ATTORNEYS.

Patented Oct. 13, 1953

2,655,073

UNITED STATES PATENT OFFICE 2,655,073

OPTICAL THICKNESS GAUGE

Allen Strickler, Los Angeles, Calif., and John H. Teeple, Wausau, Wis., assignors to Celanese Corporation of America, New York, N. Y., a corporation of Delaware Application September 23, 1950, Serial No. 186,422

7 Claims. (Cl. 88—14)

This invention relates to an optical measuring system and relates more particularly to an instrument for the measurement of the thickness of transparent or relatively transparent films, foils or other sheet materials without any contact with the surface of the sheet material whose thickness is being measured.

The measurement of the thickness of sheet materials and, particularly, the continuous gauging of the thickness of films or foils formed by casting operations employing a rotating wheel or endless band as the casting surface, has been a pressing problem in the art. The essential difficulty in satisfactorily solving this problem lies in the fact that the usual thickness gauging devices require some contact with at least one surface of the moving film or foil. Such surface contact is highly undesirable, especially since films or foils formed by casting operations where a volatile solvent is employed are relatively soft as they leave the casting surface and any contact with the surface of the film will tend to score or otherwise mar the same.

It has been proposed recently to apply an interferometric or optical method for measuring the thickness of films or foils. The advantage of such a gauging method is that it may be employed without any necessity for making contact with the surface of the film or foil whose thickness is being measured. Thus, in the application of interferometric methods of gauging film thickness, a beam of light is caused to strike a transparent or semi-transparent film or foil and to produce reflected beams from the near and far faces of the film or foil which are out of phase by an amount which is a function of the thickness of the film or foil. The out of phase light beams are then caused to travel an optical path including an optical wedge which intercepts the out of phase light beams and brings them back into phase forming an interference pattern where the thickness of the optical wedge coincides substantially with the thickness of the film or foil.

By suitably calibrating the optical wedge and providing a scale therefor, the position of the interference pattern may be utilized to indicate the thickness of the film or foil, the numerical value of thickness being read directly from said scale. Thus, direct contact with the film or foil is avoided and the thickness thereof is capable of being determined by the measuring system with a very high degree of accuracy.

Ordinarily, where an optical wedge is employed, there is but a comparatively narrow range of thicknesses over which a given optical wedge can be employed for measuring film or foil thicknesses. Thus, a series of separate optical wedges including a plurality of accurately positioned optical flats are necessary in order to provide an instrument applicable for use over the entire range of thicknesses in which films and foils are manufactured. Optical wedges formed of optical flats are not only quite expensive, but the necessity for providing a plurality of said wedges and shifting from one wedge to another is quite inconvenient since it limits the flexibility of the instrument.

It is, therefore, an important object of this invention to provide an improved device for measuring the thickness of film and foil materials by interferometric methods which is capable of accurate measurement over a relatively wide range of thicknesses.

Another object of this invention is the provision in an interferometric thickness measuring device of means for mounting the optical system employed, including improved optical flat means, whereby, upon rotation of the assembly the interference fringes which are produced may be readily observed and the thickness of the film or foil responsible for the formation of said fringes read directly from a calibrated scale cooperating therewith.

A further object of this invention is the provision of novel mounting means in an interferometric thickness measuring device including an improved optical flat whereby the optical flat present in the system may be readily removed and substituted by another flat of different thickness when an extension in the measuring range is desired.

Other objects of this invention will appear from the following detailed description and the accompanying drawing.

In the drawing, the figure is a view, in perspective, of a preferred embodiment of the novel interferometric thickness measuring device of my invention showing an optical flat, the means provided for supporting and rotating the optical flat, a calibrated scale provided for reading the thickness of the film or foil being measured, and a housing for said device.

Referring now to the drawing, the thickness measuring device of our invention, generally indicated by reference numeral 1, is contained in a suitable housing indicated by reference numeral 2. Housing 2 comprises walls 3, a top 4, base 5, and a door 6, through which access to the measuring device may be readily gained.

Side wall 7 completes the housing 2. Housing 2 is so constructed as to provide an opening 8 at one corner thereof and another opening 9 diagonally opposite to opening 8 through which sightings may be taken.

In its several elements, the thickness measuring device of our invention comprises a rod 10 carried by and freely rotatable in side wall 7. A link 11 is mounted on rod 10 and is angularly adjustable with respect thereto so that it may be held in any desired position relative thereto by means of a set screw 12. Integral with or attached to rod 10 is a frame 13 in which is set a mirror 14. The reflecting surface of mirror 14 faces a second rod 15 which is parallel both to mirror 14 and to rod 10. Rod 15 is adjustably mounted in link 11 and held in fixed position therein by means of a set screw 16. Rod 15 has an internally grooved frame 17 integral therewith or attached thereto in which frame is slidably mounted an accurately dimensioned thin parallel fused optical flat such as a sheet of mica 18. Although held firmly in position by the pressure of internally disposed flat springs (not shown) mica sheet 18 may be removed readily from frame 17 by withdrawing it from the grooves.

The entire assembly including rod 10, link 11, rod 15 and the frames carried thereby may be rotated with respect to housing 2 by means of a hand wheel 19 fixed to rod 10 at a point outside of wall 7. Also fixed to rod 10 and in a position between wall 7 and hand wheel 19 is a disc 20 on the periphery of which a scale 21 suitably calibrated to give the thickness of the film or foil being measured in any desired units. A stationary pointer 22 cooperates with scale 21 and is fixed to wall 7 by means of set screws 23 to indicate the thickness reading on scale 21.

In order to take a reading to determine the thickness of a particular film or foil, a beam of light B from a light source S is caused to strike the film or foil F whose thickness is to be measured and to produce reflected beams of light 24 comprising reflections from both the near and far surfaces of the film or foil. The beams of light when reflected are out of phase by an amount which is a function of the thickness of the film or foil. The reflected beams 24 are permitted to enter housing 2 through lower opening 8, and to strike the surface of the mica optical flat 18. Light beams 24 are reflected from the mica optical flat 18, as light beam 24', to the surface of mirror 14 from which they are reflected through opening 9 to the eye of the observer. The thickness and index of refraction of optical flat 18 are such that at a specific angle of incidence with the surface of optical flat 18 the light beams are substantially brought back into phase and thus form interference fringes. The relationship of the variables is such that the formation of the interference fringes with any given thickness of film or foil is a function of the angle of incidence of the reflected light beams relative to the mica optical flat. The interference fringes formed in mica optical flat 18 are conveniently observed since they are reflected by means of mirror 14 to the eye of the observer.

The optical path through the mica optical flat 18 may be varied by rotating hand wheel 19 and with it rod 10 so as to change the angle of incidence of reflected light beams 24 relative to optical flat 18. Thus, by slowly rotating hand wheel 19 and changing the angle of incidence of light beams 24 relative to the optical flat 18 until the interference fringes appear, a reading of thickness may then be made directly on peripheral scale 21 which is, of course, calibrated in the desired units. The range of our novel thickness measuring device may be varied, if desired, by replacing the mica optical flat 18 with an optical flat of different thickness and employing a scale 21 which is properly calibrated for use in connection with the specific optical flat employed. Either an ordinary optical flat may be employed or an optical flat consisting of a liquid film between two partly silvered thick glass flats may also be employed.

The use of optical flats in our novel device yields highly advantageous results. An optical flat that has nearly the same dispersion as the film or foil whose thickness is being measured, gives much sharper and more easily distinguished fringes than an air wedge, for example, since the optical flat keeps the interference fringes broad instead of crowding them together as in the case of an optical wedge.

It is to be understood that the foregoing detailed description is given merely by way of illustration and that many variations may be made therein without departing from the spirit of our invention.

Having described our invention, what we desire to secure by Letters Patent is:

1. In an optical measuring system for measuring the thickness of a transparent or semitransparent sheet material without any contact with a surface of said sheet material, the combination of means for directing a light beam against said sheet material to produce reflected light beams from the near and far surfaces of said sheet material, optical flat means positioned to intercept and reflect the reflected light beams, said optical flat means being so constructed and arranged that substantially all the light reflected thereby is reflected from parallel surfaces thereof, a movable support carrying said optical flat means, a fixed support for said movable support, means for varying the angular position of said movable support relative to said light beams reflected from said sheet material whereby the angular position of said optical flat means may be adjusted so that the light beams reflected therefrom are in phase to form interference fringes, a flat mirror mounted on said movable support in fixed relationship to said optical flat means for receiving and reflecting the light reflected from said optical flat means, means at a fixed, predetermined location with respect to said fixed support for defining the angle for viewing the light reflected from said flat mirror and means operatively connected to said movable support for indicating the thickness of said sheet material.

2. In an optical measuring system for measuring the thickness of a transparent or semitransparent sheet material without any contact with a surface of said sheet material, the combination of means for directing a light beam against said sheet material to produce reflected light beams from the near and far surfaces of said sheet material, optical flat means positioned to intercept and reflect the reflected light beams, said optical flat means being so constructed and arranged that substantially all the light reflected thereby is reflected from parallel surfaces thereof, a movable support carrying said optical flat means, a fixed support for said movable support, means for varying the angular position of said movable support relative to said light beams reflected from said sheet material, whereby the angular position of said optical flat means may be adjusted so that the light beams reflected therefrom are in phase to form interference fringes, a flat mirror so constructed and arranged that the mirror is always maintained parallel to the reflecting surface of said optical flat means, means at a fixed, predetermined location with respect to said fixed support for defining the angle for viewing the light reflected from said flat mirror and means operatively connected to said movable support for indicating the thickness of said sheet material.

3. In an optical measuring system for measuring the thickness of a transparent or semitransparent sheet material without any contact with a surface of said sheet material, including means for directing a light beam against said sheet material to produce reflected light beams from the near and far surfaces of said sheet material, the combination of an optical flat positioned to intercept the reflected light beams, a reflecting surface in the optical path of the light beams reflected from the optical flat, support means for said optical flat and for said reflecting surface, including a rotatably mounted rod, a frame fixed thereto for holding the reflecting surface, a link attached to said rotatable rod having a second rod mounted in said link, a frame carried by said second rod in which the optical flat is set, the construction and arrangement being such that the rotation of the rotatably mounted rod acts to vary the angle of incidence of the light beams reflected from the near and far surfaces of the sheet material relative to the optical flat and to the reflecting surface in the optical path of the light beam reflected from the optical flat, and a scale operatively connected to said rotatably mounted rod for indicating the thickness of said sheet material.

4. In an optical measuring system for measuring the thickness of a transparent or semitransparent sheet material without any contact with a surface of said sheet material, including means for directing a light beam against said sheet material to produce reflected light beams from the near and far surfaces of said sheet material, the combination of an optical flat positioned to intercept the reflected light beams, a reflecting surface in the optical path of the light beams reflected from the optical flat, support means for said optical flat and for said reflecting surface, including a rotatably mounted rod, a frame fixed thereto for holding the reflecting surface, a link attached to said rotatable rod having a second rod mounted in said link, a frame carried by said second rod and in which the optical flat is slidably set, the construction and arrangement being such that the rotation of the rotatably mounted rod acts to vary the angle of incidence of the light beams reflected from the near and far surfaces of the sheet material relative to the optical flat and to the reflecting surface in the optical path of the light beam reflected from the optical flat, and a scale operatively connected to said rotatably mounted rod for indicating the thickness of said sheet material.

5. In an optical measuring system for measuring the thickness of a transparent or semitransparent sheet material without any contact with a surface of said sheet material, including means for directing a light beam against said sheet material to produce reflected light beams from the near and far surface of said sheet material, the combination of an optical flat positioned to intercept the reflected light beams, a reflecting surface in the optical path of the light beams reflected from the optical flat, support means for said optical flat and for said reflecting surface, including a rotatably mounted rod, a frame holding the reflecting surface fixed thereto, a link attached to said rotatable rod and rotatably adjustable relative thereto having a second rod mounted in said link and rotatably adjustable relative to said link, a frame carried by said second rod and in which the optical flat is slidably set, the construction and arrangement being such that the rotation of the rotatably mounted rod acts to vary the angle of incidence of the light beams which are reflected from the near and far surfaces of the sheet material relative to the optical flat and to the reflecting surface in the optical path of the light beams reflected from the optical flat, and a scale operatively connected to said rotatably mounted rod for indicating the thickness of said sheet material.

6. In an optical measuring system for measuring the thickness of a transparent or semitransparent sheet material without any contact with a surface of said sheet material, including means for directing a light beam against said sheet material to produce reflected light beams from the near and far surfaces of said sheet material, the combination of an optical flat positioned to intercept the reflected light beams, a reflecting surface in the optical path of the light beams reflected from the optical flat, support means for said optical flat and for said reflecting surface, including a rotatably mounted rod, a frame holding the reflecting surface fixed to said rod, a link attached to said rotatable rod and rotatably adjustable relative thereto having a second rod mounted in said link and rotatably adjustable relative to said link, a frame carried by said second rod and in which the optical flat is slidably set, the construction and arrangement being such that the rotation of the rotatably mounted rod acts to vary the angle of incidence of the light beams which are reflected from the near and far surfaces of the sheet material relative to the optical flat and to the reflecting surface in the optical path of the light beam reflected from the optical flat whereby the angle of incidence at which an interference pattern is observed is translated by said scale into a direct indication of the thickness of said sheet material, and a scale operatively connected to said rotatably mounted rod for indicating the thickness of said sheet material.

7. In an optical measuring system for measuring the thickness of a transparent or semitransparent sheet material without any contact with a surface of said sheet material, including means for directing a light beam against said sheet material to produce reflected light beams from the near and far surfaces of said sheet material, the combination of an optical flat positioned to intercept the reflected light beams, a reflecting surface in the optical path of the light beams reflected from the optical flat, support means for said optical flat and for said reflecting surface, including a rotatably mounted rod, a frame holding the reflecting surface fixed to said rod, a link attached to said rotatable rod and rotatably adjustable relative thereto having a second rod mounted in said link and rotatably adjustable relative to said link, a slotted frame carried by said second rod and in which the optical flat is slidably set, the construction and arrangement being such that the rotation of the rotatably mounted rod acts to vary the angle of incidence of the light beams which are reflected from the near and far surfaces of the sheet material relative to the optical flat and to the reflecting surface in the optical path of the light beams reflected from the optical flat whereby the angle of incidence at which an interference pattern is observed is translated by said scale into a direct indication of the thickness of said sheet material, and a scale operatively connected to said rotatably mounted rod for indicating the thickness of said sheet material.

ALLEN STRICKLER.
JOHN H. TEEPLE.

References Cited in the file of this patent

UNITED STATES PATENTS

| Number | Name | Date |
| --- | --- | --- |
| 1,455,825 | Wood | May 22, 1923 |
| 2,338,981 | Straub | Jan. 11, 1944 |
| 2,518,647 | Teeple et al. | Aug. 15, 1950 |

FOREIGN PATENTS

| Number | Country | Date |
| --- | --- | --- |
| 378,742 | Great Britain | Aug. 18, 1932 |
| 631,822 | Germany | June 27, 1936 |